United States Patent [19] [11] 4,318,896

Schoonover [45] Mar. 9, 1982

[54] MANUFACTURE OF ALUMINA PARTICLES

[75] Inventor: Michael W. Schoonover, Roselle, Ill.

[73] Assignee: UOP Inc., Des Plaines, Ill.

[21] Appl. No.: 255,917

[22] Filed: Apr. 20, 1981

Related U.S. Application Data

[63] Continuation-in-part of Ser. No. 140,378, Apr. 14, 1980, abandoned.

[51] Int. Cl.[3] .......... C01F 7/02; B01J 21/04

[52] U.S. Cl. .......... 423/628; 423/630; 423/631; 252/448

[58] Field of Search .......... 423/625, 628, 630, 631; 252/448

[56] References Cited

U.S. PATENT DOCUMENTS

| | | | |
|---|---|---|---|
| 2,620,314 | 12/1952 | Hoekstra | 252/448 |
| 3,558,508 | 1/1971 | Keith et al. | 252/317 |
| 3,887,492 | 6/1975 | Hayes | 252/448 |
| 3,887,493 | 6/1975 | Hayes | 252/448 |
| 3,919,117 | 11/1975 | Michalko | 252/448 |
| 3,943,070 | 3/1976 | Mitsche | 252/448 |
| 4,048,295 | 9/1977 | Wassermann et al. | 423/626 |
| 4,108,971 | 8/1978 | Takumi et al. | 423/428 |
| 4,179,408 | 12/1979 | Sanchez et al. | 252/448 |
| 4,216,122 | 5/1980 | Michalko | 252/448 |
| 4,250,058 | 2/1981 | Michalko | 252/448 |

*Primary Examiner*—Herbert T. Carter
*Attorney, Agent, or Firm*—James R. Hoatson, Jr.; Gregory J. Mancuso; William H. Page, II

[57] ABSTRACT

An alumina particle and a method of its manufacture. The alumina particle comprises a spheroidal alumina particle of about 1/16 inch in diameter and a crush strength of from about 13 to about 16 pounds. The method comprises preparing a mixture of an acidic alumina hydrosol and an ammonia percursor at below gelation temperature, dispersing the mixture as droplets in a water-immiscible liquid at a temperature and for a time to effect at least partial gelation of the hydrosol to form hydrogel particles, contacting the hydrogel particles with a liquid having a pH no greater than about 7 and an osmotic pressure sufficient to prevent disintegration of the hydrogel particles, aging the hydrogel particles in an aqueous solution having a pH greater than 7, and thereafter drying and calcining the hydrogel particles.

16 Claims, No Drawings

MANUFACTURE OF ALUMINA PARTICLES

CROSS-REFERENCE TO RELATED APPLICATION

This application is a continuation-in-part of my prior application Ser. No. 140,378 filed Apr. 14, 1980, abandoned, all of the teachings of which are hereby incorporated herein by reference.

BACKGROUND OF THE INVENTION

The field of art to which the claimed invention pertains is alumina particles. More specifically, the claimed invention relates to a novel method of preparing alumina particles by the oil-drop method wherein no oil aging step is required, the total aging time of the alumina particles is substantially less than the total aging time required by conventional practice, and the alumina particles of this invention are substantially stronger than alumina particles produced by conventional practice.

The physical and structural properties of a catalyst influence significantly its activity and durability. To a substantial degree, the physical and structural properties of a catalyst are determined by the physical and structural properties of the catalyst support or base material. The pore structure, including the pore size distribution and pore volume, determines to a large degree the extent and accessibility of surface area available for contact of the catalytic material and the reactants. Catalytic activity is often a function of the rate of diffusion of reactants and products in and out of the interstices of a catalyst. Thus, increased pore size may facilitate the diffusion of reactants and reaction products and consequently result in increased activity. However, pore size alone does not influence catalytic activity. Catalytic activity is a function also of surface area available as a reaction site. Thus, it is desirable to obtain a catalyst with sufficient surface area and also satisfactory pore sizes.

Other physical and structural characteristics which are important for many catalysts are low density and high crush strength and attrition resistance. Low density catalysts generally are desired since low density catalysts are able to respond more rapidly to temperature changes and consequently require less time and energy to reach reaction temperature. High crush strength and attrition resistance is particularly desired of catalysts which are used in large volumes or in moving bed operations.

Alumina is a particularly desirable catalyst support material since it is of high porosity and surface area, and is structurally stable over a wide temperature range.

Catalyst particles have been manufactured in a multiple of physical shapes, the most common macrosized (about 1/32" to about ⅛") particles probably being cylinders and spheres. Spheroidal shaped catalyst particles, and especially spheroidal alumina particles, have many advantages over particles of other shapes particularly when employed as a catalyst or as a catalyst support or carrier material in a fixed bed type of operation. When so employed, such particles permit a more uniform packing whereby variations in pressure drop across the bed are minimized, and the tendency of a reactant stream to channel through the bed out of effective contact with the catalyst is substantially obviated.

In many applications, the performance of spheroidal alumina particles, either as a catalyst or as a catalyst support, is judged not only on their activity, activity stability, selectivity and selectivity stability with respect to a particular conversion process, but also on their physical stability or durability. Physical stability is of particular importance in applications where catalyst particles are subjected to vibration and general movement in a reactor or converter. Although the average particle strength may be quite acceptable, it is the disintegration of the relatively weak particles which leads to catalyst loss and the formation of fines which accumulate to plug retaining screen and effect an undue pressure drop across a catalyst bed. In addition, the disintegration of weaker particles of a tightly packed bed promotes excessive movement of the remaining particles in contact with each other resulting in further loss of catalyst through abrasion.

It appears that there are generally five methods of preparing spheroidal particles of a size suitable for commercial catalytic purposes. The oldest and least satisfactory method is the pilling operation, whereby irregularly shaped particles are operated upon mechanically, as by agitation in contact with like particles or other objects, to produce generally spheroidal particles. This method tends to produce particles of relatively non-uniform size and shape. In addition, large amounts of attrition products are produced. Finally, the operation requires significant capital investment in equipment and is energy intensive.

Another method of mechanically preparing generally spheroidal particles is by the Marumerizing technique, whereby particles are discharged onto a rotating inclined pan or disc to effect agglomerating spheroidizing of the particles. This technique suffers from many of the same disadvantages as the pilling operation.

A third method of preparing spheroidal particles is the spray drying method, whereby a solution or a slurry is sprayed through an orifice under conditions to produce numerous very small particles. This method is not suitable for the production of macrosized particles in the range of from about 1/32 inch to about ½ inch.

Two other methods of producing spheroidal alumina catalysts have been developed. Both methods involve the dropping of an alumina containing material into a water-immiscible liquid to form spheroidal particles as a result of surface tension interaction. However, the methods are quite distinct both in the alumina containing material used and in the results obtained.

One of these two methods comprises preparing crystalline alumina slurry, passing drops of the slurry through a water-immiscible liquid to form spheroidal particles, and simultaneously or thereafter passing the particles through a setting solution to rigidify the exterior surface of the spheres. (U.S. Pat. No. 3,558,508; U.S. Pat. No. 3,943,070; U.S. Pat. No. 4,179,408). In one embodiment of this method, an alumina slurry, a significant component of which is solid crystalline alumina, is prepared by admixing alumina of extremely small particle size with a small amount of a non-oxidizing acid and water. In another embodiment of the same method, the crystalline alumina slurry is prepared by commingling a precipitated alumina and an acidic aqueous medium. The general method can be characterized as follows. First, the crystalline structure of the ultimate catalyst is selected. Second, a slurry is prepared which contains substantially all or at least a significant portion of its alumina content in the same crystalline form as the desired ultimate catalyst. Third, a method of processing the slurry to form spheres is selected to minimize the disruption or change in crystalline structure of the alumina in the slurry so that the crystallized form of the alumina in the slurry is retained in the ultimate catalyst. In all cases the slurry comprises two phases, a liquid phase and a solid phase, a substantial portion of the latter comprising crystalline alumina. It appears to be necessary to minimize or at least maintain at low levels the amorphous alumina content of the slurry to promote the formation of firm spheres. Relatively small amounts of acid are used so that the solids content of the slurry is maintained and the crystalline nature of the alumina is not destroyed. The catalyst particles resulting from use of a slurry are believed to comprise a substantial amount of mechanically retained crystalline alumina particles due to the small amounts of acid used in the preparation of the slurry.

The other general method of producing spheroidal alumina particles by dropping an alumina-containing material in a water-immiscible liquid comprises the use of an amorphous alumina hydrosol. (U.S. Pat. No. 2,620,314; U.S. Pat. No. 3,919,117; U.S. Pat. No. 3,887,493). Instead of a slurry containing solid crystalline alumina, this method comprises use of a liquid or colloidal suspension of amorphous alumina without solids content. It is disclosed that the alumina hydrosol can be prepared by the hydrolysis of an acid salt or aluminum, as, by the digestion of aluminum metal under heat by an aqueous solution of aluminum chloride.

It is obvious that the method of producing spheroidal alumina particles from an alumina hydrosol is superior in many ways to the previously mentioned method which comprises the use of a crystalline alumina slurry. However, a persistent problem in the practice of the method comprising the use of a hydrosol has been the inability of the formed spheroidal particles to maintain their structural integrity if immediately removed from the water-immiscible liquid. Consequently, it has been the practice to age the particles in the water-immiscible liquid prior to their removal. The method of this invention eliminates the necessity of such an aging period.

Heretofore, the method of preparing spheroidal alumina particles from an alumina hydrosol has comprised commingling an alumina sol and a gelling agent at below gelation temperature and dispersing the mixture as droplets in a water-immiscible suspending medium, usually a gas oil, maintained at an elevated temperature whereby the hydrosol droplets are formed into firm, spherical, hydrogel particles. However, the practice has not been to immediately remove the particles from the water-immiscible liquid. Rather, it has been the practice to retain and age the hydrogel spheres in the oil suspending media for an extended period, and thereafter in an aqueous akaline media for a further extended period. The oil aging process has heretofore been considered as essential to obviate excessive cracking and sphere disintegration during the subsequent aqueous phase treatments.

It has been disclosed that the physical stability of spherical alumina particles prepared by the oil-dropping method can be enhanced by a two-step aging process using varying concentrations of ammonium hydroxide. (U.S. Pat. No. 4,108,971). Ammonia-yielding compounds also are disclosed to be useful in preparing extrudates having certain desirable pore characteristics. (U.S. Pat. No. 4,048,295). It also has been disclosed that in the preparation of amorphous alumina spheroidal particles from alumina hydrogels, cracking and sphere disintegration is caused by osmotic swelling of the hydrogel spheres resulting from the salt concentration gradient between the aqueous phase of the hydrogel spheres and the external aqueous phase. (U.S. Pat. No. 3,887,492). The solution to the problem has been disclosed to be to immerse the hydrogel particles in an aqueous solution having a pH of at least about 5.5 and a salt concentration substantially equivalent to the salt concentration of the internal aqueous phase of said hydrogel particles; maintain the particles in contact with the solution while reducing the salt concentration gradually at conditions to minimize the concentration gradient between the solution and the internal aqueous phase of the particles until the solution is substantially salt-free; separate, and dry and calcine the resulting hydrogel particles to form amorphous alumina spheres.

SUMMARY OF THE INVENTION

It is an object of the invention to present a novel method for the manufacture of spheroidal alumina particles. As will be disclosed more completely below, the method of this invention is superior to the methods mentioned above for the manufacture of spheroidal alumina particles for several reasons. The method allows the flexibility inherent in the use of alumina hydrogel rather than a crystalline alumina slurry. Yet the method also eliminates the necessity of an aging period in a water-immiscible liquid. Further, the method of this invention does not require prolonged acclimation periods in salt solutions while salt concentrations are adjusted. In addition, the method eliminates the necessity of analyzing the salt content of the hydrogel sphere itself while in a salt solution.

In one of its broad aspects, the method of this invention comprises:

(a) preparing an admixture of an acidic alumina hydrosol and an ammonia precursor at below gelation temperature, said ammonia precursor consisting essentially of a weakly basic material substantially stable at ambient temperature but convertible to ammonia at elevated temperatures;

(b) dispersing said mixture as droplets in a water-immiscible bath at a temperature and for a time to effect at least partial gelation of said hydrosol to form alumina hydrogel particles having an internal aqueous phase possessing a salt concentration;

(c) contacting said alumina hydrogel particles with an aqueous acidic solution having a pH of no greater than 7 and having a compound in said solution in a concentration substantially different from said salt concentration of said internal aqueous phase of said alumina hydrogel particles, wherein the concentration of said compound of said solution provides an osmotic pressure to prevent substantial osmotic migration of hydrogen and hydroxyl ions of said solution into said alumina hydrogel particles to thereby prevent substantial swelling and disintegration of said alumina hydrogel particles;

(d) aging said alumina hydrogel particles of step (c) in said aqueous acidic solution for a period of greater than about one-half hour without gradual reduction of the concentration of said compound in said aqueous acid solution;

(e) contacting said aged alumina hydrogel particles with an aqueous alkaline solution having a pH of greater than 7;

(f) aging said alumina hydrogel particles to firmness in said aqueous alkaline solution for a period of time of up to about 6 hours, and thereafter recovering firm alumina hydrogel particles; and (g) drying said firm alumina hydrogel particles recovered in step (f).

One of the more specific embodiments of this invention comprises the broad aspect recited above wherein step (d) occurs for at least about one-half hour and said aqueous acidic solution comprises an aqueous ammonium chloride solution comprising from about 5% to about 25% by weight ammonium chloride and having a pH of between from about 2 to about 6, and wherein step (f) occurs for at least about five hours and wherein said aqueous alkaline solution comprises an aqueous ammonium chloride solution comprising between about 5% to about 25% by weight ammonium chloride and between about 0.5% and about 3% by weight ammonia.

A third embodiment of this invention is a porous spheroidal alumina particle prepared by the first embodiment recited above, having an apparent bulk density of between about 0.5 and 0.6 grams per cubic centimeter, a surface area between about 180 and about 250 square meters per gram, a pore volume between about 0.6 and about 0.95 cubic centimeters per gram with respect to pores less than 600 angstroms in diameter, an average pore diameter between about 90 and about 160 angstroms with respect to pores less than 600 angstroms in diameter, a particle diameter d, where d is between 1/32 inch and ½ inch, and a crush strength of about 4096 ($d^2$) lbs.

Other objects and embodiments of this invention will become apparent in the following detailed specification.

DESCRIPTION OF THE INVENTION

Acidic alumina hydrosols for use herein include such as are prepared by the hydrolysis of a suitable concentration of an aluminum salt in aqueous solution at conditions to lower or reduce the acid anion concentration thereof, as, for example, by neutralization. Reduction in acid anion concentration yields a hydrosol comprising what appear to be inorganic polymers of colloidal dimension dispersed and suspended in the aqueous media. For example, an aqueous aluminum chloride solution of suitable concentration, treated as conditions to reduce the chloride anion concentration and provide an aluminum ion/chloride ion weight ratio of from about 0.9:1 to about 1.5:1, will yield an acidic alumina hydrosol such as herein contemplated.

The acid anion concentration is lowered or reduced by conventional methods known to the art. Thus, the acid anion concentration can be reduced by using aluminum metal as a neutralizing agent. In this case, the salt of neutralization is itself an aluminum salt subject to further hydrolysis and ultimate sol formation. In some cases, as in the case of aluminum acetate, in which the acid anion is sufficiently volatile, the desired acid anion deficiency is created simply by heating. Another method of producing an acidic alumina hydrosol is by the electrolysis of an aluminum salt solution in an electrolytic cell having a porous partition between the anode and the cathode whereby an acid anion deficiency is created in the cathode compartment with a formation of an alumina hydrosol therein. Aqueous aluminum chloride is one of the salt solutions which may be used satisfactorily in this method of producing an acidic alumina hydrosol.

Preferably, the acidic alumina hydrosol is an aluminum chloride hydrosol variously described as an aluminum oxychloride hydrosol, aluminum hydroxychloride hydrosol, and the like, such as is formed utilizing aluminum metal as a neutralizing agent in conjunction with an aqueous aluminum chloride solution. The aluminum chloride hydrosol is typically prepared by digesting aluminum in aqueous hydrochloric acid and/or aluminum chloride solution at about reflux temperature, usually from about 80° to about 105° C., and reducing the chloride anion concentration of the resulting aluminum chloride solution by the device of maintaining an excess of the aluminum reactant in the reaction mixture as a neutralizing agent. In any case, the aluminum chloride hydrosol is prepared containing an aluminum ion/chloride ion weight ratio of between about 0.9:1 and about 1.5:1. The aluminum may be in any convenient form. It is not necessary that the aluminum be finely ground or powdered. For ease of handling, pelletized aluminum in the hydrochloric acid reacts with the aluminum to form aluminum chloride, which in turn hydrolyzes to aluminum hydroxide.

Because the characteristics of the hydrosol influences the characteristics of the ultimate hydrogel particle produced, care should be exercised in the preparation of the hydrosol. In particular, the weight ratio of aluminum ion to chloride ion in the hydrosol affects the characteristics of the hydrogel particles produced. In addition, the purity of the aluminum used in preparing the hydrosol influences the characteristics of the resulting hydrogel particles. Since the amount and kind of impurities in the aluminum affect the hydrogel particle characteristics, impurities should be controlled.

The time of heating and digesting the aluminum in aqueous hydrochloric acid and/or aluminum chloride solution depends upon the purity and particle size of the aluminum employed. With a substantially pure aluminum, the time can range from about 24 to about 72 hours or more. The time of heating and digesting generally will change as impurities in the aluminum are increased or decreased.

The alumina hydrosol which results is believed to be a colloidal suspension of inorganic polymers comprising associated species of aluminum hydroxide and aluminum chloride. The alumina hydrosol is a liquid, or colloidal suspension, rather than a slurry. No solid phase is detectable. Thus, the hydrosol displays the fluid flow characteristics of a liquid when being transported or pumped from one point to another, and under quiescent conditions will not separate into solid and liquid phases or yield a precipitate.

The amount of acid and/or aluminum salt used in preparing the hydrosol depends on the weight ratio of aluminum to acid anion concentration desired. The apparent bulk density of the resulting hydrogel particles is a function of that ratio. In the preparation of the alumina hydrosol water can be admixed with the other constituents to achieve to hydrosol of the desired consistency. The amount of water added is a function of the strength of the acid and/or aqueous aluminum salt solution used and the concentration of the weak base to be commingled with the alumina hydrosol, discussed below.

The alumina hydrosol is preferably prepared to contain generally from about 6% to about 14% by weight of aluminum. Alumina hydrosols containing substantially more than about 18% by weight of aluminum may result in hydrosol particles with undesired characteristics, such as undue brittleness. Alumina hydrosols containing substantially less than about 6% by weight of aluminum may result in hydrosol particles with low crushing strength.

Ammonia precursors suitable for use as setting or neutralizing agents in conjunction with the method of this invention are weakly basic materials substantially stable at lower or ambient temperatures but hydrolyzable, decomposable, or otherwise convertible to ammonia at elevated temperatures. The preferred ammonia precursor is hexamethylenetetramine or urea, or mixtures thereof. Especially preferred is hexamethylenetetramine. The ammonia precursor is utilized in an amount sufficient to effect, at elevated temperatures, substantially complete neutralization of the acid anion contained in the acidic hydrosol. The ammonia precursor is preferably utilized in an amount equivalent to from about a 1:4 to about 1:1.2 mole ratio with the acid anion content of the acidic alumina hydrosol. Hexamethylenetetramine is preferably prepared as a 28% to 40% by weight aqueous solution thereof. As previously stated, the total water content of the alumina hydrosol with which the ammonia precursor has been commingled is a function of the strength of the various solutions used to prepare the hydrosol. A hydrosol of the desired water content can be achieved by varying the strengths of the solutions from which it is made.

It is preferred that the neutralization of the acid anion constituent of the hydrosol be maximized. It is also preferred that the viscosity of the hydrosol be low enough to facilitate the formation of firm spheroidal hydrosol particles in the water-immiscible liquid. To facilitate the formation of firm hydrogel particles it is preferred to admix a small amount of a weakly basic solution, such as dilute aqueous ammonia, with the hydrosol prior to commingling it with the ammonia precursor solution. The weak base enables the maximization of the neutralization of the acid anion constituent of the hydrosol. Preparation of acidic alumina hydrosols is more completely discussed in U.S. Pat. No. 2,620,314, incorporated herein by reference.

The next step in the method of this invention is the forming step, wherein the acidic alumina hydrosol, commingled with the solution of an ammonia precursor, is dispersed as droplets in a water-immiscible liquid. The hydrosol resulting from commingling the acidic alumina hydrosol with the ammonia precursor is a liquid, or colloidal suspension, which is principally water. No solid phase is present, and no crystalline structure is detectable. The alumina constituent can be characterized as amorphous in structure. The rate at which the constituents of the resulting hydrosol react or "gel" to form a firm or gelled particle is a function principally of the relative amounts of alumina and ammonia precursor from which the resulting hydrosol was prepared and of the temperature at which it is maintained.

The resulting hydrosol is dispersed as droplets into a water-immiscible liquid. It is preferred that the liquid be contained in a vertical column, so that the droplets pass downwardly through the liquid. Passage of the resulting hydrogel droplets through the water-immiscible liquid produces two effects. First, as each droplet penetrates the surface of the water-immiscible liquid it draws into a spherical shape. The droplets are principally water at this time and, being insoluble in the water-immiscible liquid, tend to draw into the shape resulting in the least surface area for their volume. The water-immiscible liquid used for this step is preferably a light gas oil chosen predominantly for its high interfacial tension with respect to water. The higher the interfacial tension of the water-immiscible liquid with respect to the resulting hydrosol, the greater the sphere-forming tendency of the resulting hydrosol in the water-immiscible liquid. The second effect of the water-immiscible liquid is that the formed particles have time to "gel" and build an initial structure before being removed from the water-immiscible liquid so they will have enough structural stability to resist the strains imposed by subsequent treatment.

In general, residence times in the immiscible liquid can vary widely and still result in the formation of satisfactory hydrogel particles. The residence time need be no longer than that required to provide the hydrogel particles with sufficient structural strength to withstand contact with the aqueous solution to which the formed particles are exposed pursuant to the method of this invention. As a practical matter, it is desirable to minimize residence times to thereby maximize the throughput of the facilities used. The required residence time is a function of the temperature of the water-immiscible liquid, the composition of the resulting hydrosol, and the size of the particles being formed. Generally, residence times in the range of from about five seconds to about 15 minutes can be used effectively. Preferred are residence times in the range of from about fifteen seconds to about two minutes. The temperature of the water-immiscible liquid can be any temperature which promotes the formation of firm hydrosol spheres.

The rate at which the resulting hydrosol forms into firm hydrogel particles is a function of the temperature of the water-immiscible liquid and the residence time of the resulting hydrosol in the water-immiscible liquid. Higher temperatures allow the use of shorter residence times. However, the temperature of the water-immiscible liquid should be below the temperature at which the water content of the resulting hydrosol vaporizes, causing cracking of the hydrogel particles. It is preferred for convenience that the resulting hydrosol be prepared at ambient temperature, and that the water-immiscible liquid into which the resulting hydrosol is dispersed be from about 50° C. to about 105° C.

The water-immiscible liquid selected should have a relatively high interfacial tension with respect to water and should remain in the liquid phase at the temperature necessary to form firm hydrogel particles. Preferred are light gas oils of a density lower than the resulting hydrosol, so that the resulting hydrosol can be dispersed in the water-immiscible liquid such that they will gravitate downward through the liquid.

To expedite the formation of firm hydrogen particles, a weak base may be dispersed throughout the water-immiscible liquid. To accomplish this purpose, ammonia can be injected into the water-immiscible liquid to flow countercurrent to the movement of the hydrosol particles. However, it is preferred that the water-immiscible liquid contain no weak base, and that the weak base required for the formation of firm hydrogel particles be commingled with the hydrosol as discussed above. It is believed that introduction of a weak base into the water-immiscible liquid would result in the formation of hydrogel particles of less structural integrity compared to hydrogen particles prepared in the manner described above wherein all the required weak base is included as a constituent of the resulting hydrosol. Injection of weak base into the water-immiscible liquid, as by bubbling ammonia through the liquid, would tend to agitate the water-immiscible liquid. Such agitation would lessen the tendency of the resulting hydrosol to form into a spherical shape since forces other than simply interfacial tension would be present.

Further, the presence of a weak base in the water-immiscible liquid could result in premature surface rigidity, since the weak base in the water-immiscible liquid would tend to promote the firming or gelling of only the surface of the hydrosol particle. The resulting non-uniform rate of firming of the particle could result in cracks in the particle, and thus lower crush strength and attrition resistance. The method of this invention does not require inclusion of a weak base in the water-immiscible liquid with its attendant problems.

As stated previously, heretofore it has been the practice to age the hydrogel particles by retaining them in a water-immiscible liquid for an extended period of time prior to exposing them to subsequent treatment. The aging period has been considered essential to avoid extensive cracking and disintegration of the hydrogel particles. It has been disclosed that cracking and disintegration observed upon placing the hydrogel particles into an aqueous environment was caused by osmotic swelling of the hydrogel particles resulting from the salt concentration gradient between the aqueous phase of the hydrogel particles and the external aqueous phase. The disclosed solution to the cracking and disintegration problem entails placing the hydrogel particles into an aqueous salt solution with a minimum pH of 5.5 and with a salt concentration substantially equivalent to the salt concentration of the internal aqueous phase of the hydrogel particles. The salt content of the solution is thereafter gradually reduced during which time the salt content of the hydrogel particles is monitored. The method of the present invention permits the hydrogel particles to be immediately contacted with an aqueous solution without restriction as to minimum pH and without the necessity of continuously or even intermittently equilibrating the salt content of the aqueous solution with that of the hydrogel particle. In fact the method of the present invention does not require the use of an aqueous salt solution, but rather allows the use of an aqueous solution of any type which can provide proper osmotic pressure.

In the method of this invention, the resulting hydrosol is dispersed in the water-immiscible liquid for a time sufficient to form spheroidal hydrogel particles sufficiently firm to withstand without undue deformation the mechanical forces inherent in transferring the particles to the aqueous solution in which the particles are aged. The degree of firmness required is a function only of the type of mechanical forces the particles must withstand, and the type of mechanical forces which act upon the particles depends upon the method used to transfer the particles. If the method of transfer comprises allowing the particles to flow from the water-immiscible liquid to the aqueous solution, it can be anticipated that relatively small mechanical forces will act upon the particles. If the method of transfer comprises mechanically removing the particles from the water-immiscible liquid and thereafter immersing them in the aqueous solution, as by use of a collection means and an immersing means, it can be anticipated that greater mechanical forces will act upon the particles. Depending upon the method of transfer selected, the composition of the resulting hydrosol, and the temperature of the water-immiscible liquid into which the resulting hydrosol is dispersed, the required residence time of the particles, in the water-immiscible liquid will be increased or decreased. The approximate residence time can be chosen easily with minimal trial and error. The most important point is that neither a prolonged residence time nor an aging time in the water-immiscible liquid are required.

The aqueous solution to which the hydrogel particles are next exposed can be any aqueous solution which satisfies two criteria; (i) the pH of the solution must be below about 7; and (ii) the osmotic pressure of the solution must be sufficient to prevent cracking or disintegration of the particles. Any aqueous solution which satisfies the foregoing two criteria can be used.

The alumina content of the hydrogel particles is substantially completely amorphous, no crystalline alumina being detectable. It is believed that for this reason the hydrogel particles are sensitive to pH. The pH requirement can be satisfied by any conventional means, as by including in the aqueous solution a small amount of acid such as hydrochloric acid, sulfuric acid, nitric acid and others. The amount of acid required is only that amount necessary to maintain the pH of the aqueous solution below about 7. The method of this invention anticipates that the hydrogel particles will be contacted with the aqueous solution before the hydrogel particles have completely gelled and therefore before the reaction among the resulting hydrosol constitutents has completed. As a consequence, the method of this invention anticipates that ammonia may continue to be evolved from the hydrogel particles after they have contacted the aqueous solution. For this reason, sufficient acid must be included in the aqueous solution to neutralize the ammonium hydroxide which results from the evolution of ammonia. Any acid may be used, its selection to be determined by convenience. Preferred is hydrochloric acid. Particularly convenient is the same acid used in preparing the hydrosol, since in that case only one acid anion would be present in the hydrogel particle environment.

Although the method of this invention encompasses the use of any pH below about 7, the preferred pH ranges from about 4 to about 6. As stated above, the osmotic pressure requirement arises from the observation that alumina hydrogel spheres swell, crack, and sometimes disintegrate entirely when placed in a solution of deionized water immediately after their removal from the immiscible liquid without aging. The unaged spheres have an internal aqueous phase possessing a salt concentration. It has been theorized that the surface of the sphere behaves like a semi-permeable membrane, and therefore unless the osmotic pressure of the internal aqueous phase of the sphere is counteracted by an osmotic pressure provided by the sphere's aqueous external environment, migration of hydrogen and hydroxyl ions will occur across the sphere surface so as to allow the osmotic pressures to equilibrate. In such a case, equilibrium will require the osmosis of hydrogen and hydroxyl ions into the sphere, causing the sphere to swell and ultimately destroying the physical integrity of the sphere.

The osmotic presure requirement can be satisfied by any convenient means. As illustrated in the examples to this specification, either ionic or non-ionic compounds may be used to provide the necessary osmotic pressure. As a matter of convenience it is preferred to use an aqueous acidic solution of a salt or salts to provide the necessary osmotic pressure. Especially preferred is a salt having the same anion as the acid used in preparing the hydrosol and/or in providing the necessary maximum pH. Particularly preferred is ammonium chloride. The necessary concentration of the constituent or constituents of the aqueous solution providing the required osmotic pressure depends on the degree of firmness of the hydrogel particle upon contacting the aqueous solution, and upon the number of species produced by the compound or compounds in solution. The osmotic pressure supplied by the aqueous solution must be at least sufficient to maintain the integrity of the hydrogel particles. It is not required, however, that the osmotic pressure of the aqueous solution be equivalent to the osmotic pressure of the hydrogel particles. For that reason it is not necessary that the osmotic pressure of the aqueous solution be adjusted either continuously or intermittently to correspond to the osmotic pressure of the hydrogel particle. Likewise, it is not necessary that the osmotic pressure of the aqueous solution be below any particular maximum osmotic pressure. The method of this invention requires only a minimum osmotic pressure in the aqueous solution. That minimum osmotic pressure can be determined for any particular hydrogel particle by a simple trial and error examination, similar to that used in Example XII hereof, in which hydrogel particles are immersed in several aqueous solutions of different osmotic pressure and then observed for cracks.

The concentration of the osmotic pressure-providing compound or compounds in the aqueous acidic solution is substantially different from the salt concentration of the internal aqueous phase of the alumina hydrogel particles. Further, aging of the particles in the aqueous acidic solution is without gradual reduction of the concentration of the compound or compounds in the solution. It is to be understood that reference to "concentrations" is actually reference to the relative numbers of species introduced into a solution by a substance. Thus, in these terms the concentration in solution of a mole of a salt which dissociates into two species would be twice the concentration of a compound which does not dissociate in solution.

The preferred aqueous acidic solution is an aqueous salt solution comprising about 5 wt % salt. Especially preferred is an aqueous ammonium chloride solution comprising at least about 5 wt % ammonium chloride.

The hydrogel particles must remain in contact with the aqueous solution until they are able to withstand exposure to an alkaline environment without undue cracking or disintegration.

The required duration of this aging step varies according to the firmness of the hydrogel particles upon first contacting the aqueous solution, and the rate at which the particles are becoming firm. Both the firmness of the particles and the rate at which they become firm are a function of the amount of ammonia precursor used in preparing the hydrosol. The required duration of the aging step does not appear to be a function of the characteristics of the aqueous solution. It has been found that the method of this invention permits aging times with aqueous solutions of substantially shorter duration than the aging times heretofore required in either water-immiscible liquids or aqueous salt solutions. As set forth in the examples of this specification, aging times of as short a duration as about one-half hour have been used successfully. Because of the nature of the interaction among the constituents of the resulting hydrosol there is no maximum limit to the duration of the contacting step other than a limit set by convenience.

The method of this invention anticipates that as a matter of convenience the aqueous solution contacting step is conducted at ambient temperature and pressure. The method does not preclude temperature and pressures other than ambient, however, since the method is neither temperature nor pressure dependent. Performing the contacting step at a temperature elevated with respect to ambient temperature increases the rate at which the hydrogel particles become firm, and thereby decreases the required contacting time. The maximum temperature limitation for the aqueous solution is the same as for the water-immiscible liquid, i.e., the temperature should not be above the point at which the aqueous constituent of the hydrogel particles vaporizes. Temperatures in the range of from about ambient temperature to about 105° C. are preferred.

The method of this invention does not preclude the use of a conventional oil aging step in the preparation of hydrogel particles. Thus, the hydrogel particles can be retained in the water-immiscible liquid or be aged in a water-immiscible liquid prior to the contacting of the particles with the aqueous solution. However, no advantage would be realized from doing so, and the method of this invention does not require doing so.

The next step of the method of this invention is the contacting of the hydrogel particles with an aqueous alkaline solution having a pH greater than about 7. The hydrogel particles must thereafter be aged in the alkaline solution until they have attained the desired degree of firmness. The required duration of this aging step depends upon the degree of firmness of the particles upon first being exposed to the alkaline solution. For example, if the aging of the particles in the aqueous acidic solution is of sufficient duration, the reaction among the constituents of the resulting hydrosol will have progressed essentially to the point of completion and the hydrogel particles will have reached their maximum degree of firmness during that aqueous acid solution aging step. In such a circumstance, contacting and aging the particles in an aqueous alkaline solution is not necessary, since, if sufficient ammonia precursor was incorporated into the resulting hydrosol, no firming of the hydrogel particles will result from the second contacting and aging steps. However, the method of this invention allows a substantially shorter period of time for the formation of firm hydrogel particles than would be possible by elimination of the aqueous alkaline solution aging step. The method of this invention anticipates that the aqueous acidic solution aging is of only such duration as allows the hydrogel particles to be exposed to an alkaline environment without undue cracking or disintegration. By minimizing the time of the aqueous acidic solution aging the total duration of the two aging steps will be minimized. However, the method of this invention offers the flexibility of allowing substantial variation in the duration of the aging steps in producing satisfactory hydrogel particles. Although for convenience it is preferred to minimize the total duration of the aging steps, satisfactory hydrogel particles can be produced using aging periods greatly in excess of the minimum periods required. The preferred duration of the aqueous alkaline solution aging step is about 6 hours, although it appears that periods as short as 5 hours could be used with satisfactory results.

No minimum osmotic pressure is required of the aging solution. Therefore, no constituent need be included in the aging solution to provide osmotic pressure. However, it is preferred that the aging solution possess a compound having a concentration sufficient to provide at least slight osmotic pressure to further ensure the physical integrity of the hydrogel particles. Providing slight osmotic pressure in the aging solution would tend to counterbalance the effects of premature exposure of the hydrogel particles to the alkaline aging solution. Osmotic pressure can be provided in the same way as in the contacting solution, as discussed above. In particular, an aqueous salt solution of about 5 wt.% is preferred. Especially preferred is an aqueous solution of between about 5 wt.% and about 25 wt.% of the same salt used in the contacting solution to provide osmotic pressure.

The pH of the aging solution must be above about 7. It is preferred that the aging solution be an aqueous solution of a weak base. Especially preferred is an aqueous solution of ammonium hydroxide. A particularly convenient aging solution is prepared by introducing small amounts of ammonia into water, to provide an aqueous solution of between about 0.5 wt.% and about 3 wt.% ammonia.

The method of this invention anticipates that as a matter of convenience the aging step is conducted at ambient temperature and pressure. The method does not preclude temperatures and pressures other than ambient, however, since the method is neither temperature nor pressure dependent. Performing the aging step at a temperature elevated with respect to ambient temperature increases the rate at which the hydrogel particles become firm, and thereby decreases the aging time. The maximum temperature limitation for the aging solution is the same as for the water-immiscible liquid and the aqueous solution of the contacting step, i.e., the temperature should not be above the point at which the aqueous constituent of the hydrogel particle vaporizes. Temperatures in the range of from about ambient temperature to about 105° C. are preferred.

After the aging procedure, the hydrogel particles are washed in any suitable manner. A particularly satisfactory method is to wash the particles by percolation, either with an upward or downward flow of water, and preferably with water containing a small amount of ammonium hydroxide and/or ammonium nitrate. After washing, the hydrogel particles may be dried at a temperature of from about 95° to about 315° C. for 2 to 24 hours or more, or dried at this temperature and calcined at a temperature of from about 425° to about 760° C. for 2 to 12 hours or more, and utilized as such or composited with other catalytic components. It is preferred that the particles be dried slowly and also that the drying be effected in a humid atmosphere since it has been found to result in less breakage of the particles.

The resulting alumina particles have a very high crush strength and attrition resistance. The alumina particles can be produced in spheroidal form in widths or diameters ranging from about 1/32 inch to about ½ inch. Particle sizes of from about 1/16 inch to about ⅛ inch are preferred for most applications. For spheroidal alumina particles of about 1/16 inch diameter satisfactory particles with crush strengths in the range of about 12 pounds to about 16 pounds are attainable. As indicated in the attached examples, 1/16 inch particles with crush strengths in excess of 16 pounds also can be obtained. Particles which exhibit attrition of less than ½% can be produced by the method of this invention. Alumina particles of consistent characteristics, including apparent bulk density, size, crush strength, and pore characteristics, can be produced by the method of this invention. Such particles are unique in their characteristics and particularly adapted to use as substrates or bases for catalytic composites. In particular, alumina particles can be produced with any apparent bulk density in the range of from about 0.3 to about 0.7 grams per cubic centimeter, with surface areas from about 180 to about 250 square meters per gram, and with respect to pores of less than 600 angstroms in diameter, with pore volumes from about 0.6 to 0.95 cubic centimeters per gram and average pore diameters from about 90 to about 160 angstroms.

It is well known that the crush strength of a spheroidal particle is proportional to the cross-sectional area of the particle. Thus, a particle with twice the cross-sectional area of another particle will be expected to possess twice the crush strength of the other particle. Since the cross-sectional area of a particle is proportional to the square of a particle's diameter, the relation between crush strength and particle size can be expressed as $C_1/C_2=d_1^2/d_2^2$, where $C_1$ and $C_2$ are the crush strengths of particles of diameters $d_1$ and $d_2$, respectively. If the crush strength of a particle of a particular diameter is known, the crush strengths of similar particles of different diameters can be calculated by the above relationship. For the relationship to be valid, characteristics of the particles, such as composition and density, must be substantially indentical.

Using the above relationship, the crush strengths of particles of diameters different than 1/16 inch made by the method of this invention can be determined. Since spheroidal particles of about 1/16 inch diameter can be prepared by the method of this invention to display a crush strength of between about 12 pounds and at least about 16 pounds, the general range of crush strength of particles of different diameters made by the method of this invention can be determined by:

$$C_{max} = 16 \times d^2/(1/16)^2 = 4096\, d^2 \qquad C_{min} = 12 \times d^2/(1/16)^2 = 3072\, d^2$$

where C is the crush strength in pounds of a particle of diameter d inches. Using the above equations, it can be seen that the method of this invention can produce, for example spheroidal particles of about 1/32 inch diameter with a crush strengths of from about 3 pounds to about 4 pounds, and spheroidal particles of about ⅛ inch diameter with a crush strength of from about 48 pounds to about 64 pounds, with apparent bulk densities in the range of from about 0.5 to about 0.6 grams per cubic centimeter. Since the crush strengths of spheroidal particles manufactured by the method of this invention increase with increasing apparent bulk density, it is expected that particles with apparent bulk densities greater than about 0.6 grams per cubic centimeter would possess crush strengths in excess of those predicted by the above equation. It should also be noted that the surface area, pore volume, and average pore diameter, on a weight basis, of spheroidal particles manufactured by the method of this invention are not a function of the size of the particles of a particular apparent bulk density. Thus, the size of a spheroidal particle of a particular apparent bulk density may be increased to produce a particle with greater crush strength but with the same surface area, pore volume, and pore diameter characteristics on a weight basis.

In the pore diameter range of from about 20 to about 80 angstroms the pore volume of the particles is from about 0.3 to about 0.4 cc/g. The dried and calcined particles are not completely amorphous alumina, but rather crystalline alumina is detectable by X-ray analysis. The degree of crystallinity, and the types of crystalline structures present in the dried and calcined particle can be controlled by the temperature of the aging step and the temperature at which calcination takes place, in accordance with well-known phase relationships for alumina. Thus, if aging takes place at a temperature below about 70° C., a portion of the amorphous alumina content of the hydrogel particle will be converted to bayerite. Depending on the calcination temperature employed, the alumina particles resulting after drying and calcination will comprise amorphous alumina and crystalline alumina in a form of eta alumina, theta alumina, and/or alpha alumina. Likewise, if aging takes place at temperatures in excess of about 70° C., a portion of the amorphous alumina content of the hydrogel particle will be converted to boehmite. Depending on the calcination temperature employed, the alumina particles resulting after drying and calcination will comprise amorphous alumina and crystalline alumina in the form of gamma alumina, delta alumina, theta alumina, and/or alpha alumina.

The alumina particles of this invention display a substantially higher crush strength than has heretofore been disclosed. Because high crush strength is of critical importance for many catalytic uses, the alumina particles of this invention can be used advantageously as substrates or bases for various types of catalytic composites, particularly catalytic composites which are exposed to severe environments. Particularly important is the fact that the alumina particles of this invention display surface area and pore characteristics comparable to alumina particles heretofore disclosed with lower crush strengths. Although the reason for the superior characteristics of the alumina particles of this invention are not completely understood, those characteristics probably are attributable to several factors. It is believed that one important contributor to the superiority of the alumina particles of this invention is the fact that the particles are exposed to a water-immiscible liquid environment for a much shorter period of time than has been the prior practice. It can be expected that because of the reduced exposure time there exists a smaller likelihood of the introduction of impurities from the water-immiscible liquid. Another important contributor to the characteristics of the alumina particles is the fact that the overall time from initial exposure of the resulting hydrosol to the water-immiscible liquid until the drying of the alumina particles begins is substantially less than the times disclosed by the prior art. It is probable that the increased rate of stabilization or firming of the hydrogel particles advantageously influences the mechanism by which chemical bonding takes place within the particles.

The alumina particles prepared in accordance with the method of this invention are advantageously employed as a support or carrier material for other catalytic components to promote various hydrocarbon conversion reactions including dehydrogenation of specific hydrocarbons or petroleum fractions, isomerization of specific hydrocarbons or petroleum fractions, hydrocracking of lower molecular weight hydrocarbons such as occur in the kerosene and gas oil boiling range, and the oxidation of hydrocarbons to provide first, second and third stage oxidation products. Reaction conditions employed in the various hydrocarbon conversion reactions are those heretofore practiced. For example, alkylaromatic isomerization reaction conditions include a temperature of from about 100° to about 535° C., a pressure of from about atmospheric to about 1500 psig., a hydrogen to hydrocarbon mole ratio of from about 0.5 to about 20, and a liquid hourly space velocity of from about 0.5 to about 20. Likewise, a typical hydrocracking operation is effected at a pressure of from about 500 to 1500 psig., a temperature of from about 200° to about 500° C., a liquid hourly space velocity of from about 4 to about 10, and a hydrogen circulation rate of from about 1000 to about 10,000 standard cubic feet per barrel of hydrocarbon charge (SCF/Bbl).

The alumina particles of this invention are of particular advantage as a support or carrier material for a platinum group metal component, alone or in combination with a tin component, a rhenium component, a germanium component and/or a cobalt component to yield an improved reforming catalyst. The platinum group metal component is suitably composited with the support or carrier material by impregnation and/or ion-exchange techniques familiar to the art. For example, a soluble platinum group compound, that is, a soluble compound of platinum, palladium, rhodium, ruthenium, osmium and/or iridium, is prepared in aqueous solution, and the alumina particles soaked, dipped, or otherwise immersed therein. Suitable platinum group compounds include platinum chloride, chloroplatinic acid, ammonium chloroplatinate, dinitrodiaminoplatinum, palladium chloride, and the like. It is common practice to impregnate the support or carrier material with an aqueous chloroplatinic acid solution acidified with hydrochloric acid to facilitate an even distribution of platinum on the support or carrier material. The support or carrier material is preferably maintained in contact with the impregnating solution at ambient temperature conditions, suitably for at least about 30 minutes, and the impregnating solution thereafter evaporated to dryness. For example, a volume of the particulate support or carrier material is immersed in a substantially equal volume of impregnating solution in a steam jacketed rotary dryer and tumbled therein for a brief period at about room temperature. Steam is thereafter applied to the dryer jacket to expedite evaporation of the impregnating solution and recovery of substantially dry impregnated particles. Thus, a further embodiment of this invention relates to an alumina support or carrier material characterized by a surface area of from about 180 to about 210 $m^2/g$ and a pore volume of from about 0.3 to about 0.4 cc/g in the pore diameter range of from about 20 to about 80 angstroms, said alumina being impregnated with from about 0.1 to about 2.0 wt.% platinum.

As heretofore stated, the alumina composition of this invention is useful as a support or carrier material for a platinum group metal component alone or in combination with a tin component, a rhenium component, a germanium component and/or a cobalt component. The tin, rhenium, germanium and/or cobalt components may be composited with the support or carrier material in any conventional or otherwise convenient manner. Suitable methods include impregnation and/or ion-exchange of the support or carrier material with a suitable compound of one or more of said components in any desired sequence, with or without intermediate calcination. In the impregnation of the support or carrier material, it is preferred practice to impregnate one or more of said components on said support or carrier material simultaneously with the platinum group metal component from a common impregnating solution. For example, when the added component is tin, stannic chloride is conveniently and advantageously prepared in common solution with chloroplatinic acid, the concentration of each component therein being sufficient to yield a catalyst product containing from about 0.01 to about 2.0 wt.% platinum and from about 0.1 to about 5.0 wt.% tin calculated as the elemental metal. Similarly, when the desired added component is rhenium, perrhenic acid and chloroplatinic acid can be prepared in a common aqueous solution to impregnate the support or carrier material, suitably with from about 0.01 to about 2.0 wt.% platinum and from about 2.0 wt.% rhenium. Thus, another embodiment of this invention concerns an alumina support or carrier material characterized by a surface area of from about 180 to about 210 $m^2/g$ and a pore volume of from about 0.3 to about 0.4 cc/g in the pore diameter range of from about 20 to about 80 angstroms, said alumina being impregnated with from about 0.01 to about 2.0 wt.% rhenium.

The tin, rhenium, germanium and/or cobalt components and particularly the tin, germanium and cobalt components are advantageously composited with the alumina, by including a suitable acid salt thereof in the aforementioned hydrosol. For example, an acid salt of tin such as stannous or stannic chloride, may be admixed with said hydrosol and serve not only as a precursor of the desired tin component, but also as the metal salt of a strong acid as herein contemplated. Following the particle forming process and subsequent calcination, the alumina is obtained comprising the tin component in intimate combination therewith and suitable for further impregnation and/or ion-exchange to incorporate, for example, the platinum group metal component.

The final catalyst composite generally will be dried at a temperature of from about 95° to about 315° C. for a period of from about 2 to about 24 hours or more, and finally calcined at a temperature of from about 375° to about 595° C. in an air atmosphere for a period of from about 0.5 to about 10 hours in order to convert the catalytic component substantially to the oxide form. Although not essential, it is preferred that the resultant calcined catalytic composite be subjected to a substantially water-free reduction step prior to its use in the conversion of hydrocarbons. This step is designed to insure a uniform and finely divided dispersion of the catalytic component throughout the carrier material. Preferably, substantially dry hydrogen is used as the reducing agent in this step. The reducing agent is contacted with the calcined catalyst at a temperature of from about 425° to about 650° C. and for a period of from about 0.5 to about 10 hours. This reduction treatment may be performed in situ as part of a start-up sequence if precautions are taken to predry the plant to a substantially water-free state and if substantially water-free hydrogen is used.

The reforming of gasoline boiling range petroleum fractions to improve the octane rating thereof is a process well known to the petroleum refining industry. The petroleum fraction may be a full boiling range gasoline fraction boiling in the 10°–220° C. range, although it is more often what is called a naphtha fraction, a gasoline fraction having an initial boiling point of from about 65° to about 120° C. and an end boiling point of from about 175° to about 220° C. Reforming conditions generally include a pressure of from about 50 to about 1000 psig, and a temperature of from about 425° to about 595° C. The catalyst of this invention permits a stable reforming operation to be effected in a preferred pressure range of from about 50 to about 350 psig. utilizing a hydrogen/hydrocarbon mole ratio of from about 0.5 to about 10 and a liquid hourly space velocity of from about 0.5 to about 10. Preferably, a temperature of from about 485° to about 565° C. is employed.

The following examples are presented in illustration of the improvement resulting from the practice of this invention and said examples are not to be construed as an undue limitation on the generally broad scope of the invention as set out in the appended claims.

EXAMPLE I

The alumina particles of this example are commercially available alumina particles prepared by a prior art method involving oil dropping and oil aging, which can be summarized as follows. Aluminum pellets were digested in dilute (about 30 wt.%) aqueous hydrochloric acid solution at about 90° C. to obtain a hydrosol containing aluminum in a 1.16:1 weight ratio with the chloride anion content thereof. The hydrosol was thereafter cooled and admixed with an aqueous hexamethylenetetramine (HMT) solution to provide a resulting hydrosol containing about 7.1 wt.% aluminum. The resulting hydrosol was formed into spheroidal hydrogel particles by dispersing the hydrosol as droplets in a gas oil suspending medium contained in a vertical column maintained at about 95° C. The spheroidal hydrogel particles recovered from the bottom of the column were aged in a portion of the gas oil for about 15 hours at a temperature of about 95° C. The ammonia age was then effected over about a 7 hour period by immersing and retaining the spheroidal particles in a 1.5–2 wt.% aqueous ammoniacal solution. The ammonia-aged particles were thereafter water-washed, dried in air at about 300° C. and calcined in air at about 650° C. to yield a product of 1/16 inch diameter alumina spheres.

EXAMPLE II

This example is presented in illustration of one embodiment of the present invention. In the preparation of an acidic alumina hydrosol, aluminum pellets were digested in dilute hydrochloric acid at about 102° C. to obtain a hydrosol with a specific gravity of about 1.345 and containing aluminum in about a 1.15:1 weight ratio with the chloride anion content thereof. The hydrosol was thereafter cooled to about 15° C. and admixed with a 28% aqueous HMT solution to provide a resulting hydrosol containing about 6.8 wt.% aluminum. The amount of HMT present in the resulting hydrosol corresponded to 210% theoretical neutralization of the chloride anion content of the resulting hydrosol. The resulting hydrosol was formed into spheroidal hydrogel particles by dispersing the hydrosol as droplets in a gas oil suspending medium contained in a vertical column maintained at about 95° C. The spheroidal hydrogel particles were recovered from the bottom of the column in a wire basket and were immediately removed from the oil and aged first under quiescent conditions in an aqueous solution of 10 wt.% ammonium chloride for about 19 hours at a temperature of about 95° C. The ammonium chloride hydrogel particles immediately thereafter were subjected to a second aging in an ammonium chloride-buffered aqueous ammoniacal solution for about six hours at about 95° C. The buffered solution contained 5 wt.% ammonium chloride and sufficient ammonium hydroxide to provide about 1 wt.% ammonia. The solution was passed upward through a bed of the hydrogel particles during the period of the aging step.

The ammonia-aged particles were thereafter water-washed at about 95° C. for about 7 hours with five gallons of deionized water to which had been added 20 cc of ammonium hydroxide, dried, on trays in air at about 120° C., and calcined in air for about two hours at 610° C. at 3% relative humidity to yield a product of 1/16 inch diameter alumina spheres.

EXAMPLE III

This example illustrates another embodiment of the present invention. The alumina particles of this example were prepared in exactly the same manner as the alumina particles of Example II, except that a 20 wt.% aqueous ammonium chloride solution was used to age the spheroidal hydrogel particles during the first aging step instead of a 10 wt.% aqueous ammonium chloride solution.

EXAMPLE IV

This example illustrates another embodiment of the present invention. The alumina particles of this example were prepared in exactly the same manner as the alumina particles of Example II, except that the buffered solution of the second aging step contained 10 wt.% ammonium chloride instead of 5 wt.% ammonium chloride.

EXAMPLE V

Examples II, III, and IV differed from one another only in ammonium chloride concentrations used during the aging steps. Total aging time in all three examples was 25 hours. In this example, illustrating another embodiment of this invention, the total duration of the aging steps was reduced. The alumina particles of this example were prepared in exactly the same manner as the alumina particles of Example IV, except that the duration of the first aging step was 0.5 hour instead of 19 hours.

EXAMPLE VI

In this example, illustrating another embodiment of this invention, the amount of HMT present in the resulting hydrosol was modified. The alumina particles of this example were prepared in exactly the same manner as the alumina particles of Example V, except that the amount of HMT present in the resulting hydrosol corresponded to 181% theoretical neutralization of the chloride content of the resulting hydrosol, and the aluminum content of the hydrosol was about 7.3 wt.%.

EXAMPLE VII

This example illustrates another embodiment of this invention. In this example, the ammonium chloride concentration of the first and second aging steps was modified. The alumina particles of this example were prepared in exactly the same manner as the alumina particles of Example V, except that the ammonium chloride aging step and the 6 hour aqueous ammoniacal solution aging step were conducted using 5 wt.% aqueous ammonium chloride solutions rather than 10 wt.% aqueous ammonium chloride solutions, and the duration of the ammonium chloride aging step was 2 hours rather than 0.5 hour.

EXAMPLE VIII

This example illustrates another embodiment of this invention. In this example, the duration of the first aging step was modified. The alumina particles of this example were prepared in exactly the same manner as the alumina particles of Example VII, except that duration of the first aging step, the ammonium chloride aging step, was 2 hours rather than 0.5 hour.

EXAMPLE IX

The commercially available alumina particles produced as generally described in Example I, and the embodiment of this invention illustrated in Examples II through VIII, were subjected to various tests to determine and compare their characteristics. The characteristics selected included apparent bulk density (ABD), particle crush strength (PCS), relative attrition (Rel. Att.), surface area (SA), total pore volume (PV), average pore diameter (PD), and the percentage of cracked particles. Table I below summarizes the conditions of each of the foregoing examples as well as the results of the above-mentioned tests. The tests were performed using standard widely accepted analytical methods. The percent of cracked spheres was determined by contacting calcined particles with chloronaphthalene for a few minutes and then visually observing the spheres. Cracked spheres became transparent after short contact times. The surface area, pore volume, and pore diameter measurements were made using well-known nitrogen adsorption techniques. Particle crush strength was determined by placing a dried and calcined particle between two horizontal parallel plates, and moving the plates together. The amount of force required to crush the particle is registered on a dial as crush strength in pounds. A sufficient number of particles (e.g., 50) is crushed in order to obtain a statistically significant average crushing strength for all particles. Relative attrition was determined by a differential weight method. A sample of dried and calcined particles of known weight was subjected to agitation by a mechanical agitator for a period, weighed, and the loss in weight expressed as a percentage of the initial weight of the sample is designated the relative attrition. Average gamma alumina crystallite size was determined by X-ray analysis. Yield was calculated as the weight of the particles after drying screening to desired size (through U.S. #8 onto U.S. #16 sieve), and calculating as a percentage of the weight of the resulting hydrosol contacted with the water-immiscible liquid. Pore volume was determined by standard nitrogen adsorption techniques. The method depends on the condensation of nitrogen in the pores of the particles, and is effective for measuring pores with pore diameters in the range of 10 to 600 angstroms. Surface area also was determined by nitrogen adsorption analysis, as was pore diameter. Nitrogen adsorption techniques are discussed by H. W. Daeschner and F. H. Stross, Anal. Chem. 34, (1962), and by S. Brunauer, P. Emmett, and E. Teller, J. Am. Chem. Soc., V.60. p. 309 (1938).

TABLE I

| | (Oil Aged) | (Not Oil Aged) | | | | | | | |
|---|---|---|---|---|---|---|---|---|---|
| | I | II | III | IV | V | VI | VII | VIII | IX |
| Al/Cl | 1.16 | 1.15 | 1.15 | 1.15 | 1.15 | 1.15 | 1.15 | 1.15 | 1.15 |
| % Al | 7.1 | 6.8 | 6.8 | 6.8 | 6.8 | 7.0 | 7.3 | 6.8 | 7.3 |

TABLE I-continued

| | (Oil Aged) | (Not Oil Aged) | | | | | | | |
|---|---|---|---|---|---|---|---|---|---|
| | I | II | III | IV | V | VI | VII | VIII | IX |
| % Neut. | 180 | 210 | 210 | 210 | 210 | 203 | 181 | 210 | 180 |
| 1st Age | | | | | | | | | |
| % $NH_4Cl$ | — | 10 | 20 | 10 | 10 | 10 | 10 | 5 | 10 |
| % $NH_3$ | — | 0 | 0 | 0 | — | — | — | — | — |
| Time, Hr. | 15 | 19 | 19 | 19 | 0.5 | 0.5 | 0.5 | 2 | 2 |
| 2nd Age | | | | | | | | | |
| % $NH_4Cl$ | — | 5 | 5 | 10 | 10 | 10 | 10 | 5 | 10 |
| % $NH_3$ | 1.5 | 1 | 1 | 1 | 1 | 1 | 1 | 1 | 1 |
| Time, Hr. | 7 | 6 | 6 | 6 | 6 | 6 | 6 | 6 | 6 |
| ABD, g/cc | 0.52 | 0.59 | 0.57 | 0.59 | 0.51 | 0.54 | 0.51 | 0.54 | 0.50 |
| % Cracked Spheres | | <1 | <1 | <1 | <1 | <1 | 78 | 31 | 7 |
| PCS, Lb. Avg. | 8-10 | 16.3 | | | 13.4 | 13.3 | 3.4 | 16.9 | 10.5 |
| Rel. Att., Wt. % | 1.5-2 | 0.83 | | | 0.8 | 0.4 | 93 | 19.5 | 4.8 |
| Yield, wt. % | 81-86 | 87 | 90 | 88 | 85 | 88 | 83 | 96 | 90 |
| SA, $m^2/g$ | 200 | 183 | 189 | 194 | 202 | 198 | | 187 | 184 |
| PV 600A, cc/g | 0.75 | 0.70 | 0.77 | | 0.81 | 0.78 | | 0.75 | 0.84 |
| PD 600A, A | 145 | 152 | 163 | | 161 | 157 | | 159 | 184 |
| Avg. Crystallite Size, A | 54 | 56 | | | 56 | 56 | | | |

EXAMPLE X

To further compare an embodiment of this invention with alumina particles manufactured by conventional methods, the alumina particles of Example VI were used as a base in the manufacture of catalytic reforming catalyst. The resulting catalytic reforming catalyst was compared to a commercially available reforming catalyst of the same size with the same apparent bulk density and metals content. The comparative evaluation was performed using a laboratory scale catalytic reforming unit operating at 300 psig, a LHSV of 2 $hr^{-1}$, a gas-to-oil ratio of 3, a naphtha feedstock, and a 100 RON product target. The comparative evaluations are set forth in Table II. The commercially available catalyst is labeled "Catalyst A", and the catalyst prepared using the embodiment of this invention set forth in Example VI is labeled "Catalyst B". The severity of processing required to produce the target product is indicated in degrees F. as the difference between the reactor catalyst bed temperature and a constant base temperature. Since the unit was operated to obtain a product of 100 RON, the catalyst bed temperature is a measure of the severity of the operation necessary to reach the target octane. Because less severe operating conditions are required of a more active catalyst to produce the same octane product, catalyst activity is inversely proportional to the required severity of operation as measured by catalyst bed temperature.

TABLE II

| | Severity, °F. | |
|---|---|---|
| Days on Stream | Catalyst A | Catalyst B |
| 1 | 24 | 16 |
| 2 | 35 | 24 |
| 3 | 42 | 32 |
| 4 | 49 | 35 |
| 5 | 54 | 39 |
| 6 | 60 | 42 |
| 7 | 62 | 45 |
| 8 | 67 | 50 |
| 9 | 68 | 52 |
| 10 | 72 | 55 |
| 11 | 75 | 60 |

EXAMPLE XI

To further explore the relationship between osmotic pressure and alumina particle physical integrity, alumina particles were exposed to various aqueous solutions and then observed for crack formation. Spheroidal hydrogel particles were prepared as set forth in Example III, were immediately removed from the bottom of the vertical column containing gas oil, and cooled to room temperature in gas oil. The hydrogel particles were not aged, either in oil or in aqueous solution. After the unaged particles had cooled to room temperature, samples of the particles were immersed in aqueous solutions of various concentrations at room temperature and observed. The results of the experiment are set forth in Table III.

TABLE III

| Solution | pH | Observation |
|---|---|---|
| Deionized $H_2O$ | 6.2 | 100% Cracked |
| 10% NaCl | 6.2 | No Cracks |
| 10% $NH_4Cl$ | 4.5 | No Cracks |
| 5% $NH_4Cl$ | 6.2 | No Cracks |
| 2.5% $NH_4Cl$ | 6.2 | 100% Cracked |
| 25% $NH_4Cl$ | 6.2 | No Cracks |
| 10% Sugar | 6.2 | 100% Cracked |
| 33% Sugar | 6.2 | No Cracks |
| 5% $NH_4Cl$ + 1% $NH_3$ | 9.0 | 100% Cracked |
| 5% $NH_4Cl$ + 0.1% $NH_3$ | 8.0 | 100% Cracked |
| 5% $NH_4Cl$ + 0.01% $NH_3$ | 7.4 | 30% Cracked |
| 5% $NH_4Cl$ + 1% HCl | 1.0 | No Cracks |
| 33% HMT | 8.2 | 100% Cracked |

EXAMPLE XII

An experiment was performed to investigate the effect of pH on the physical integrity of the alumina particles. Samples of the unaged spheroidal hydrogel particles were prepared as recited in Example XI. After the unaged particles had cooled to room temperature in gas oil, samples of the particles were immersed in aqueous solutions of various pH levels at room temperature and observed.

The results of the experiment are set forth in Table III above.

EXAMPLE XIII

A final comparison of an embodiment of this invention and a commercially available catalytic composite was made. The embodiment of this invention prepared as set forth in Example V and a commercially available catalytic composite for use in the catalytic reforming of naphtha feedstocks were analyzed to determine their respective micropore size distributions. The same well-known nitrogen adsorption technique was used in analyzing both catalysts. The results of the analyses are set forth in Table IV.

TABLE IV

| Micropore Diameter A | Micropore Volume, ml/g/A × $10^4$ | |
|---|---|---|
| | Particles A | Particles B |
| 20 | 2 | 2 |
| 40 | 17 | 15 |
| 60 | 24 | 22 |
| 80 | 24 | 22 |
| 100 | 25 | 24 |
| 120 | 25 | 25 |
| 140 | 25 | 25 |
| 160 | 25 | 25 |
| 180 | 20 | 20 |
| 200 | 22 | 23 |
| 220 | 20 | 23 |
| 240 | 18 | 20 |
| 260 | 15 | 16 |
| 280 | 14 | 15 |

The foregoing examples can be summarized generally as illustrating the following:

1. Contrary to the teaching of the prior art, an oil-age step is not required in the preparation of alumina particles by the oil dropping method.

2. The method of this invention of preparing alumina particles requires a total aging time of substantially shorter duration than the conventional oil dropping methods of preparing alumina particles.

3. The alumina particles of this invention display improved crush strength, attrition resistance, and micropore characteristics compared to alumina particles of substantially the same size, apparent bulk density, and surface area prepared by conventional methods.

I claim as my invention:

1. A method of preparing alumina hydrogel particles which comprises:

(a) preparing an admixture of an acidic alumina hydrosol and an ammonia precursor at below gelation temperature, said ammonia precursor consisting essentially of a weakly basic material substantially stable at ambient temperature but convertible to ammonia at elevated temperatures;

(b) dispersing said mixture as droplets in a water-immiscible bath at a temperature and for a time to effect at least partial gelation of said hydrosol to form alumina hydrogel particles having an internal aqueous phase possessing a salt concentration;

(c) contacting said alumina hydrogel particles with an aqueous acidic solution having a pH of no greater than 7 and having a compound in said solution in a concentration substantially different from said salt concentration of said internal aqueous phase of said alumina hydrogel particles, wherein the concentration of said compound of said solution provides an osmotic pressure to prevent substantial osmotic migration of hydrogen and hydroxyl ions of said solution into said alumina hydrogel particles to thereby prevent substantial swelling and disintegration of said alumina hydrogel particles;

(d) aging said alumina hydrogel particles of step (c) in said aqueous acidic solution for a period of greater than about one-half hour without gradual reduction of the concentration of said compound in said aqueous acid solution;

(e) contacting said aged alumina hydrogel particles with an aqueous alkaline solution having a pH of greater than 7;

(f) aging said alumina hydrogel particles to firmness in said aqueous alkaline solution for a period of time of up to about 6 hours, and thereafter recovering firm alumina hydrogel particles; and, (g) drying said firm alumina hydrogel particles recovered in step (f).

2. The method of claim 1 wherein the ammonia precursor of step (a) is hexamethylenetetramine.

3. The method of claim 1 wherein the ammonia precursor of step (a) is utilized in an amount to effect substantially complete neutralization of the acid anion contained in said mixture.

4. The method of claim 1 wherein the hydrosol of step (a) is an aluminum hydroxychloride hydrosol having an aluminum ion/chloride ion weight ratio of from about 0.9:1 to about 1.5:1, and said ammonia precursor is hexamethylenetetramine in from about a 1:4 to about a 1:1.2 mole ratio with the chloride ion content of said mixture.

5. The method of claim 1 wherein the water-immiscible bath of step (b) is at a temperature of from about 30° to about 105° C.

6. The method of claim 1 wherein said aqueous acidic solution of step (c) comprises an aqueous salt solution having a salt concentration of at least about 5 wt.%.

7. The method of claim 1 wherein said aqueous acidic solution of step (c) comprises an aqueous ammonium chloride solution comprising at least about 5 wt.% ammonium chloride.

8. The method of claim 1 wherein the pH of step (c) is between about 4 and about 6.

9. The method of claim 1 wherein said aqueous acidic solution of step (c) is at a temperature of from about 30° C. to about 105° C.

10. The method of claim 1 wherein the aging of step (d) is performed at a temperature of from about 30° C. to about 105° C.

11. The method of claim 1 wherein said aqueous alkaline solution of step (e) possesses a compound having a concentration sufficient to provide at least a slight osmotic pressure to ensure the physical integrity of said alumina hydrogel particles recovered in step (f).

12. The method of claim 1 wherein said aqueous alkaline solution of step (e) comprises between about 0.5% and about 3% by weight ammonia.

13. The method of claim 1 wherein said aqueous alkaline solution of step (e) comprises an aqueous ammonium chloride solution comprising at least about 5 wt.% ammonium chloride and between about 0.5% and about 3% by weight ammonia.

14. The method of claim 1 wherein said duration of the aging of step (f) is at least about 5 hours.

15. The method of claim 1 wherein step (d) occurs for at least about one-half hour and said aqueous acidic solution comprises an aqueous ammonium chloride solution comprising between about 5% and about 25% by weight ammonium chloride and having a pH of between about 2 and about 6, and wherein step (f) occurs for at least about five hours and wherein said aqueous alkaline solution comprises an aqueous ammonium chloride solution comprising between about 5% and about 25% by weight ammonium chloride and between about 0.5% and about 3% by weight ammonia.

16. The method of claim 1 wherein the hydrogel particles of step (g) are dried and calcined at a temperature of from about 425° to about 750° C.

* * * * *